United States Patent
Wilt et al.

(10) Patent No.: US 7,796,252 B2
(45) Date of Patent: *Sep. 14, 2010

(54) SCANNING MONOCHROMATOR WITH DIRECT DRIVE GRATING

(75) Inventors: Robert Randall Wilt, Columbia, MD (US); George E. Toth, Columbia, MD (US)

(73) Assignee: Unity Scientific, LLC, Brookfield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/317,239

(22) Filed: Dec. 19, 2008

(65) Prior Publication Data

US 2009/0225315 A1 Sep. 10, 2009

Related U.S. Application Data

(63) Continuation of application No. 11/351,056, filed on Feb. 9, 2006, now Pat. No. 7,483,134.

(51) Int. Cl.
G01J 3/28 (2006.01)

(52) U.S. Cl. ..................................... 356/328

(58) Field of Classification Search ................. 356/328, 356/334

See application file for complete search history.

(56) References Cited

U.S. PATENT DOCUMENTS

| | | | |
|---|---|---|---|
| 4,285,596 A | 8/1981 | Landa | |
| 4,540,282 A | 9/1985 | Landa et al. | |
| 4,732,476 A * | 3/1988 | Barshad | 356/308 |
| 4,804,266 A | 2/1989 | Barshad | |
| 4,838,691 A | 6/1989 | Master et al. | |
| 4,969,739 A * | 11/1990 | McGee | 356/308 |
| 5,173,748 A | 12/1992 | Bilhorn | |
| 5,359,409 A | 10/1994 | Wildnauer et al. | |
| 5,497,230 A | 3/1996 | Ohkubo et al. | |
| 5,657,121 A | 8/1997 | Nishina | |
| 5,710,627 A | 1/1998 | Inoue et al. | |
| 5,828,061 A | 10/1998 | Kakimoto | |
| 6,362,878 B1 | 3/2002 | Wang et al. | |
| 6,643,011 B2 | 11/2003 | Kojima | |
| 6,678,044 B2 | 1/2004 | Kaneko | |
| 6,683,686 B2 | 1/2004 | Weigold et al. | |
| 6,710,332 B2 | 3/2004 | Joukawa et al. | |
| 6,853,450 B1 | 2/2005 | Iwasaki et al. | |
| 6,973,233 B1 | 12/2005 | Tomita et al. | |

* cited by examiner

Primary Examiner—Kara E Geisel
(74) Attorney, Agent, or Firm—Sentry Law Group; Steven P. Wigmore (57) ABSTRACT

A novel scanning monochromator uses a PM stepper-motor to directly drive a diffraction grating. By employing interpolated encoder feedback in combination with the PM stepper-motor feedback, a resolution of over 250,000 pulsed steps is available for each revolution of the PM stepper-motor. This translates into more than 20,000 incremental angular-displacement steps over a usable 30° range of dispersion-element rotation. High field accuracy is achieved by a direct PM stepper-driven diffraction grating, and a unique calibration approach based on Wood's anomalies. A plurality of diffracted light beams emerge from the oscillating grating, and these are scanned past a detector for detection, whereby the relative rotation information of the grating can be detected with great accuracy. A number of tolerance-correcting measures are also included to yield an extremely accurate, self-lubricating scanning monochromator that can be economically produced.

18 Claims, 10 Drawing Sheets

SCANNING MONOCHROMATOR WITH DIRECT DRIVE GRATING

CROSS-REFERENCE TO RELATED APPLICATIONS

This application is a continuation of and claims priority to application Ser. No. 11/351,056 filed Feb. 9, 2006 now U.S. Pat. No. 7,483,134, entitled "Scanning Monochromator with Direct Drive Grating," the entire contents of which are incorporated by reference.

BACKGROUND OF THE INVENTION

1. Field of the Invention

The present invention relates to monochromators and, more particularly, to a high-accuracy scanning monochromator with improved optical path and direct drive diffraction grating is for constituent or characteristics analysis of a sample.

2. Description of the Background

Scanning monochromators are well-known and generally include an oscillating diffraction grating, a drive mechanism for rotating the diffraction grating, a light source, and light sensor. Light from the light source is dispersed off the diffraction grating and the narrow bands of diffracted light are scanned across a sample. An encoder tracks the angular position of the grating, and this coupled with a measurement of the narrow bands of light reflected off the sample gives an absorption spectrum by which the sample can be analyzed.

In oscillating the diffraction grating, the drive assembly must be capable of producing a linear change in wavelength at the exit aperture of the monochromator. Unfortunately, the efficiency of diffraction gratings are not constant as they oscillate (efficiency being defined as the power of monochromatic light diffracted into the order being measured, relative to the energy flow of the incident light). Thus, it becomes necessary to control the magnitude and variation of diffracted energy with wavelength. This control process is known as "blazing", and it is traditionally accomplished by manipulating the geometry of the grating grooves across the face of the grating. R. W. Wood pioneered blazing by producing the first grating having a controlled groove shape. This facilitated modern diffraction gratings which have specific efficiency curves. The choice of an optimal efficiency curve for a grating depends on the specific application. In the context of a monochromator, the desired instrumental efficiency is linear. In other words, the intensity of light transformed into signals at the image plane must be constant across the spectrum. This requires peak grating efficiency in the region of the spectrum where the detectors are least sensitive. For example, a visible-light spectrometer using a silicon detector would be much less sensitive in the blue than in the red, and thus the grating must be blazed to yield a peak efficiency in the blue. A typical efficiency curve shows a single maximum, at a peak wavelength $\lambda_B$. The efficiency curve also depends on the angles of use (i.e., the angles of incidence and diffraction). Moreover, the curve depends on the groove spacing and the material with which the grating is coated.

Traditionally, diffraction gratings have been rotated or oscillated by a drive motor through a mechanical reduction drive assembly. However, the diffraction grating must be rotated sinusoidally with extreme accuracy, and it is very difficult to implement a drive that can achieve this with the requisite resolution. Moreover, these drive assemblies leave no convenient means of calibration.

For instance, U.S. Pat. No. 5,096,295 to Krupa et al. illustrates a reduction gear arrangement wherein the diffraction grating is mounted to a rotatable platform and is motor-driven via a reduction gear transmission. A Hall-effect sensor is used to track the angular position of the diffraction grating. Unfortunately, neither the Hall-effect sensor or any other known encoders are capable of high-resolution tracking as necessary to compensate for mechanical tolerances. Even the slightest tolerances in the mechanical parts can dramatically affect accuracy and performance of existing drive systems. Moreover, mechanical configurations lead to mechanical wear, and this too affects accuracy and performance over time. A direct-drive diffraction grating and control system would provide much more flexibility and programmable control, as well as providing the ability to compensate for mechanical tolerances. However, it has not previously been possible to attain the degree of resolution required in a direct-drive diffraction grating system using conventional servo or stepper motors.

U.S. Pat. No. 5,625,270 to Barker et al. shows a scanning monochromator with a directly driven spectral-dispersion element. The spectral-dispersion element is directly coupled to the output shaft of a stepper motor. The movement of the motor is controlled with an electronic circuit that switches electrical current through the motor windings and produces a variable pulse-width ranging from 0 to 100 percent modulation. The electrical circuit includes pulse-width modulator (PWM) and computer sections. The PWM section accepts values from the computer section and converts these values into variable pulse-width signals for use by the power driver section. The computer section supplies values to the PWM section based upon requirements for the motor movement and position. The required motor position is determined by the type of spectral-dispersion element and the desired wavelength selection of the monochromator. However, the stepper motor relies on two-phase windings, and the pulse-width modulation is accomplished by controlling the ratio of the electrical currents applied to the two windings. This method of pulse-width modulation entails complex control calculations and commensurate hardware, again too slow and costly for a production environment.

It would be greatly advantageous to provide an economical scanning monochromator with direct drive diffraction grating and encoder feedback to a stepped control system, the control system being capable of pre-programmed introduction of local phase delays to adjust for aberrations in the optical system, thereby providing a linear composite wavefront and more accurate results.

In addition, it would be greatly advantageous to provide a more convenient and efficient method of calibrating the monochromator without sacrificing accuracy. The multiplicity of variables and the extreme resolution required in a scanning monochromator typically compels tight calibration standards. Traditionally, monochromators which calibrate based on reference scans using a standard sample (often polystyrene or rare earth powders) from the National Institute of Standards and Technology (NIST). This baseline scan is used as a reference to compensate subsequent live scans for component tolerances and slippage. However, it is very difficult to calibrate a monochromator this way in the field. As a result, prior art monochromators are factory-calibrated and then slowly lose their accuracy over time.

It is well recognized that anomalies occur along the efficiency curve at which the efficiency changes abruptly. First observed by R. W. Wood, these sharp peaks and troughs in an efficiency curve are referred to as Wood's anomalies. Lord Rayleigh suggested that anomalies occur when light of a given wavelength and spectral order is diffracted at 90° from the grating normal (i.e., it passes over the grating horizon). This results in a discontinuity in the diffracted power for a given wavelength and order because the power that would diffract into the given order is instead redistributed among other spectral orders. This causes abrupt changes in the power diffracted into the other spectral orders.

U.S. Pat. No. 4,330,211 to Peterson suggests a method and apparatus for compensating for Wood's anomalies using a second diffraction grating. Any deviation from the Wood's anomaly region by the input beam will substantially reduce the intensity of the output. This intensity variance is detected and utilized as an indication of a small angular deviation of the input beam. Peterson suggests the utilization of a control system to continually maintain the doubly diffracted beam intensity or efficiency at a maximum, thus allowing the direction of an incoming beam to be maintained to a high degree of precision. However, this approach leads to a complex optical system and a commensurate control system, too slow and costly for a production environment.

Despite the foregoing, Wood's anomalies provide just as much opportunity as obstacle. If a processor is programmed to resolve the position of the Wood's regions, the data can then be compared against baseline stored values established at factory calibration. In other words, calibration can be achieved automatically using the Wood's regions as opposed to prior art monochromators which are calibrated based on reference scans using a standard sample from the NIST. This would be greatly advantageous because the monochromator could be calibrated frequently (i.e., at time intervals ranging from just prior to every live scan to every ten or twenty minutes, or longer). Moreover, calibration can take place in the field without the need for expensive sampling standards.

SUMMARY OF THE INVENTION

It is, therefore, an object of the present invention to provide an analytical monochromator that is capable of an accurate and thorough analysis of a variety of characteristics of a sample, including constituent analysis or characteristics analysis (moisture content, taste, texture, crispness, viscosity, etc.).

It is another object to accomplish the above using a compact optical layout and direct drive control system to oscillate the diffraction grating with high accuracy.

It is another object to provide a direct drive control system with no gearing, plus an algorithm to rotate the drive motor a few complete revolutions at predetermined intervals to reorient the grease of the rotor bushing and to reduce wear, both of the foregoing to improve the mechanical lifetime and enhance the performance of the drive system.

It is another object to incorporate encoder feedback and a number of pre-programmed tolerance-correcting measures into the control system, the control system being capable of pre-programmed introduction of local phase delays to adjust for aberrations in the optical system, thereby providing a linear composite wavefront and more accurate results to minimize the effects of mechanical tolerances and wear.

It is still another object to provide an optical encoder wheel and interpolated sensing (rather than a Hall-effect sensor) to give much higher resolution encoding.

It is still another object to incorporate an automatic calibration cycle using the Wood's regions as opposed to calibration based on reference scans, thereby allowing the monochromator to be calibrated frequently, at time intervals ranging from just prior to every live scan to every ten or twenty minutes, or longer (up until the long term instability of the system hampers accurate matrix analysis). Moreover, calibration can take place in the field without the need for expensive sampling standards.

It is another object to provide a scanning monochromator with all of the above-described features that can be economically produced.

According to the present invention, the above-described and other objects are accomplished by providing a scanning monochromator that uses a PM stepper-motor to directly drive a diffraction grating. The use of interpolated encoder feedback in combination with the PM stepper-motor feedback provides superior resolution for each revolution of the PM stepper-motor. High field accuracy is achieved by a direct pulse modulated (PM) stepper motor-driven diffraction grating, and a unique calibration approach based on Wood's anomalies. A number of tolerance-correcting measures are also included to yield an extremely accurate, self-lubricating scanning monochromator that can be economically produced, and conveniently and efficiently operated.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The invention disclosed herein is an improved optical layout and direct-drive diffraction grating for an analytical scanning monochromator. The optical layout and drive provides simplified calibration, high-speed functional capability, and improved durability, collectively facilitating real-time analysis of a sample based on one or more characteristics of the sample, such as constituent analysis, moisture content, taste, texture, viscosity, etc.

Figure 1:
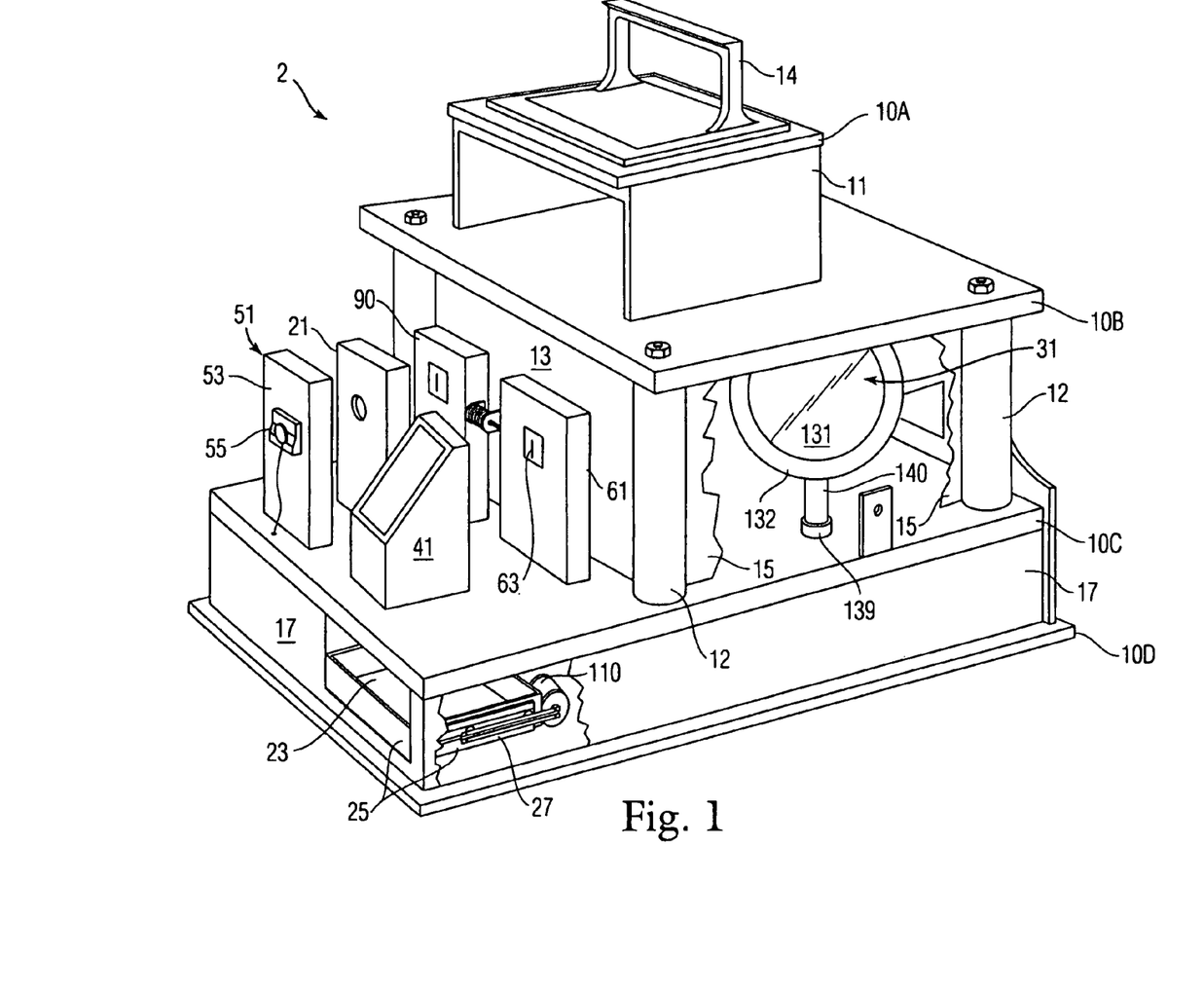
FIG. 1 is an overhead perspective view of the scanning monochromator 2 according to a preferred embodiment of the present invention.
Figure 2:
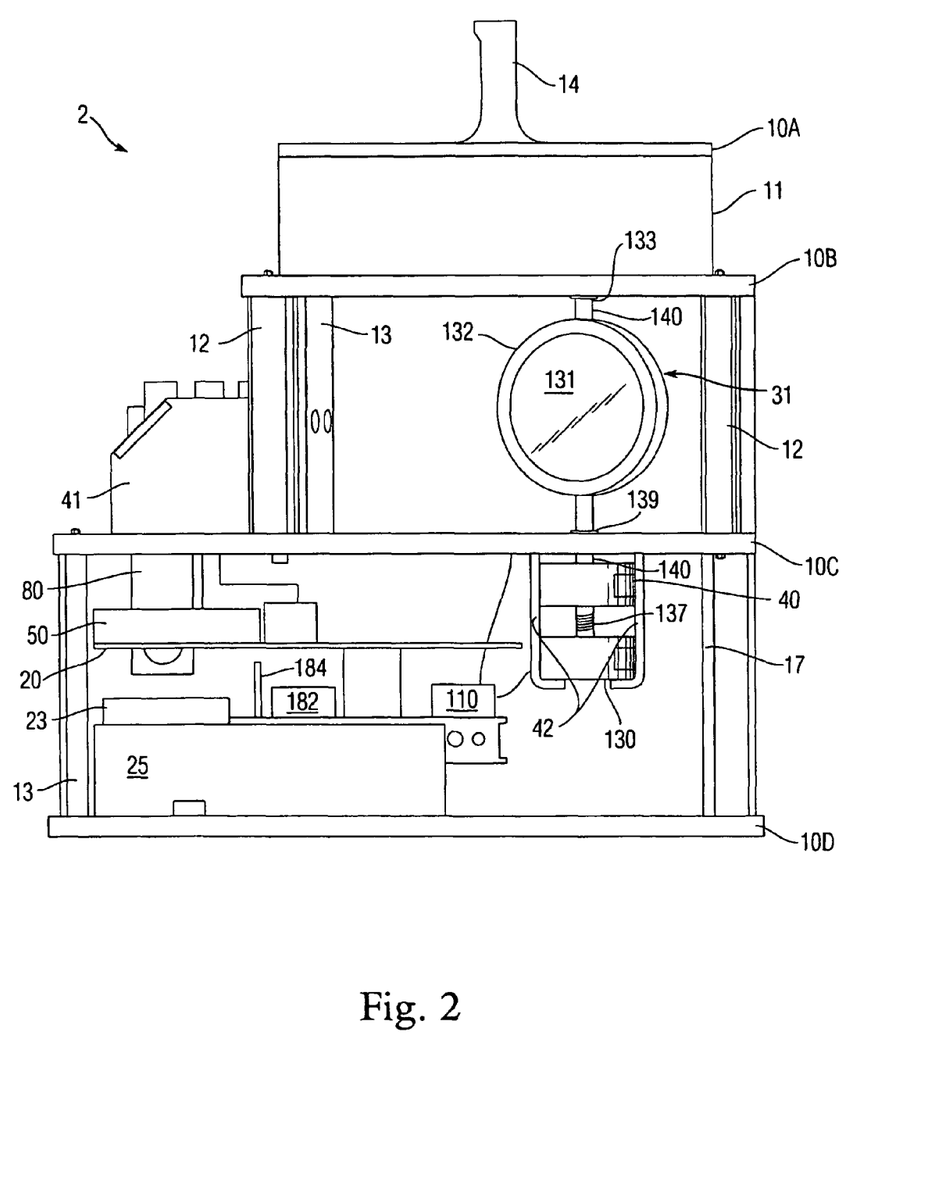
FIG. 2 is a side view of the scanning monochrometer 2.
Figure 3:
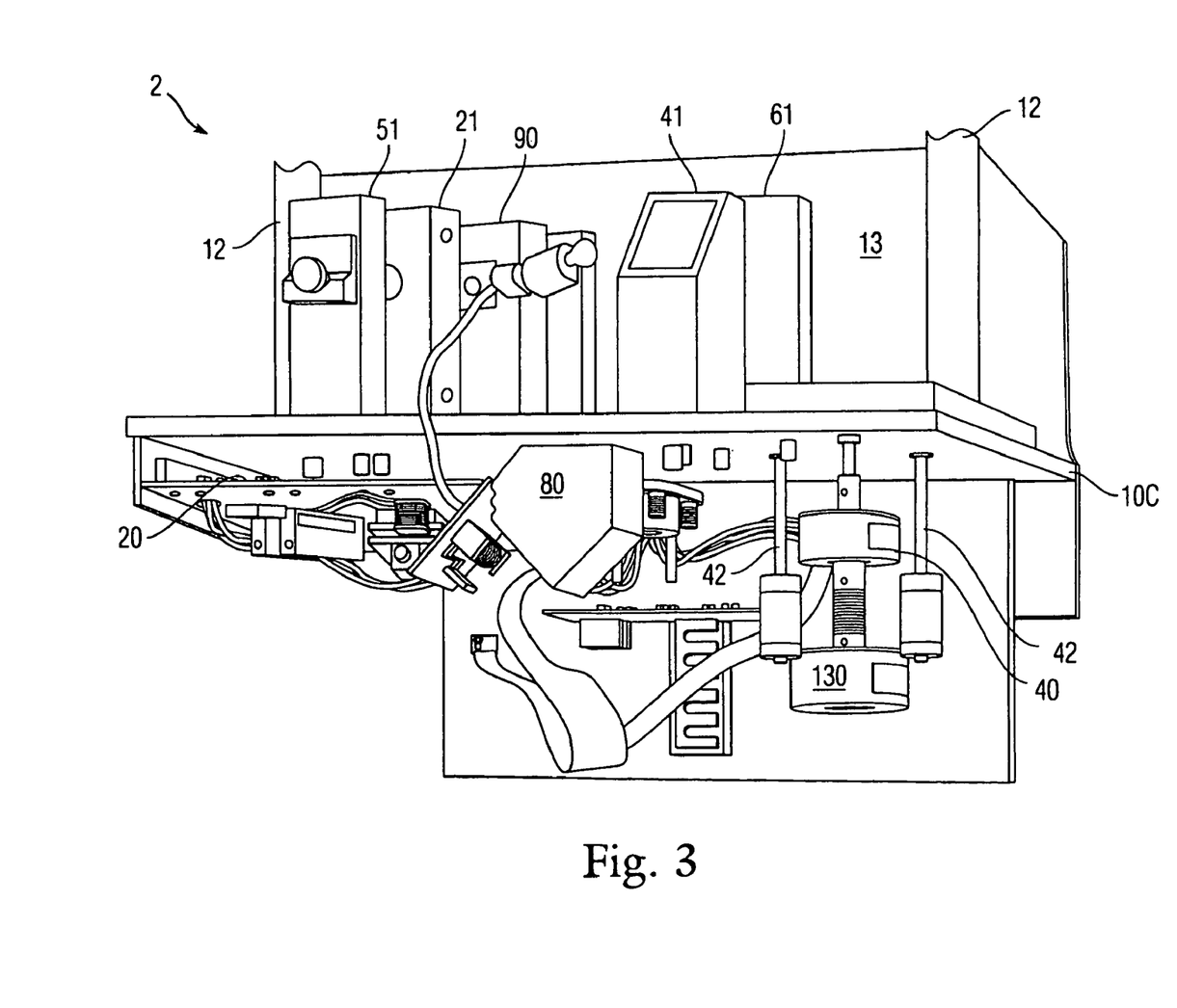
FIG. 3 is a partial perspective view from the bottom with the sample drawer 25 and bottom platform 10D removed.

FIG. 1 is an overhead perspective view of the scanning monochromator 2 according to a preferred embodiment of the present invention. FIG. 2 is a side view of the scanning monochrometer 2, and FIG. 3 is a partial perspective view from the bottom (with sample drawer 25 and bottom platform 10D removed). With collective reference to FIGS. 1-3, the monochromator 2 is housed in a compact three-tier system support frame formed from four horizontal rectangular platform sections 10A-10D. Upper platform sections 10A & 10B are separated by two opposing upper walls 11, and an upwardly disposed carry handle 14 may be mounted on top. Platform sections 10B & 10C are separated by four perpendicular pylons 12. The pylons 12 are enclosed within four mid-panel walls including a front baffle 13 and side and rear walls 15. The placement of pylons 12 leaves room at the forefront of platform 10C for an optical bench (to be described), and the baffle 13 and walls 15 define an light-protected enclosure for an oscillating diffraction grating assembly 31 (also to be described). The lower platform sections 10C & 10D are bounded by lower walls 17 to define a lower enclosure. The lower enclosure within the support frame houses the system electronics as well as a sample tray 23 mounted atop an outwardly-sliding shelf 25. The sample tray 23 (to be described with respect to FIG. 8) is slidably oriented toward the side of the support frame (between platform sections 10C and 10D), is carried on opposing rails 27, and is driven by a servo motor 110 (to be described) for automatic extraction/retraction therein to provide a convenient and accurate means to position specimen materials for analysis. A light baffle 184 is attached to the shelf 25 behind the sample tray 23, and this is an upwardly protruding L-bracket for segregating the tray 23 from an Optical Reference 182 placed directly behind the light baffle 184. This allows sliding movement of the Optical Reference 182 to the exact location a sample would normally be positioned in tray 23. Alternatively, an Optical Reference spectral sample may be placed directly into the sample tray 23. In the preferred embodiment a Spectralon (tm) puck 182 is used as a reference sample.

Figure 8:
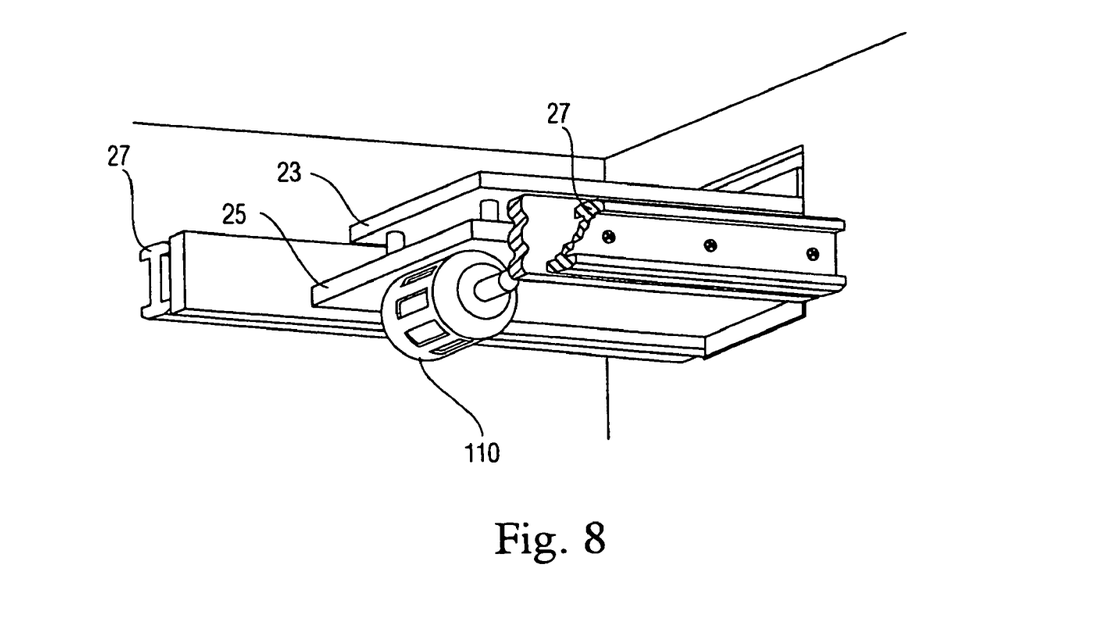
FIG. 8 is a side perspective view of the sample drawer 23.

The optical bench in advance of baffle 13 serves as a mounting platform for five sub-assemblies, including a light source assembly 51, an entrance optics block 21, an entrance slit/shutter assembly 90, an exit slit assembly 61, and an exit optics block 41. In general operation, the light source assembly 51 emits a broad spectrum of radiation which is collimated by entrance optics block 21, projected on to the grating 31 through the slit 93 of the slit/shutter assembly 90 through the baffle 13 toward the diffraction grating assembly 31. The shutter 92 is activated by solenoid 91 to block light passage into the monochromator enclosure. The diffraction grating assembly 31 disperses light by diffracting different wavelengths at different angles. The diffraction grating assembly 31 is positioned so that a selected spectral component of light emanates through baffle 13 passing through the exit slit 63 of the exit slit assembly 61 while is blocking all other non-harmonic spectral colors. The higher order harmonic wavelengths are blocked from detection by an order sorting low-pass optical filter installed in the detecter block 80. The particular wavelengths that pass through are selected by the angle of the grating assembly 31, and scanning a spectrum is accomplished by rotating the grating assembly 31 with a motor (to be described). The scanned light passing from the exit slit assembly 61 is reflected downward by the exit optics block 41 through the platform 10C and onto sample in the sample tray 23. A detector 80 (see FIG. 2) is situated proximate to the sample tray 23 and measures the intensity of the diffusely reflected light from the sample, converting the light power to an electrical signal by which a quantitative analysis of any of a variety of characteristics of a sample, including constituent analysis, moisture content, taste, texture, viscosity, etc., can be quantitatively determined. The detector 80 is a lensed assembly observing only the diffuse emanation of light from the sample at the point of illumination. Its field of view is restricted and its optical geometry assures that the detector is optically underfilled thereby maximizing energy collection while minimizing secondary optical bandwidth restriction and stray light inclusion. The order sorting filter (mentioned above) could be placed in the exit optics block 41 or even at the entrance to monochromator at the entrance optics block 21. However, to allow convenient manufacturing and observation of the light patterns even in the field, the order sorting filter was placed in the detector block 80. For samples sensitive to visible components (higher order harmonics), the order sorting filter would be installed in the exit block 41.

Figure 4:
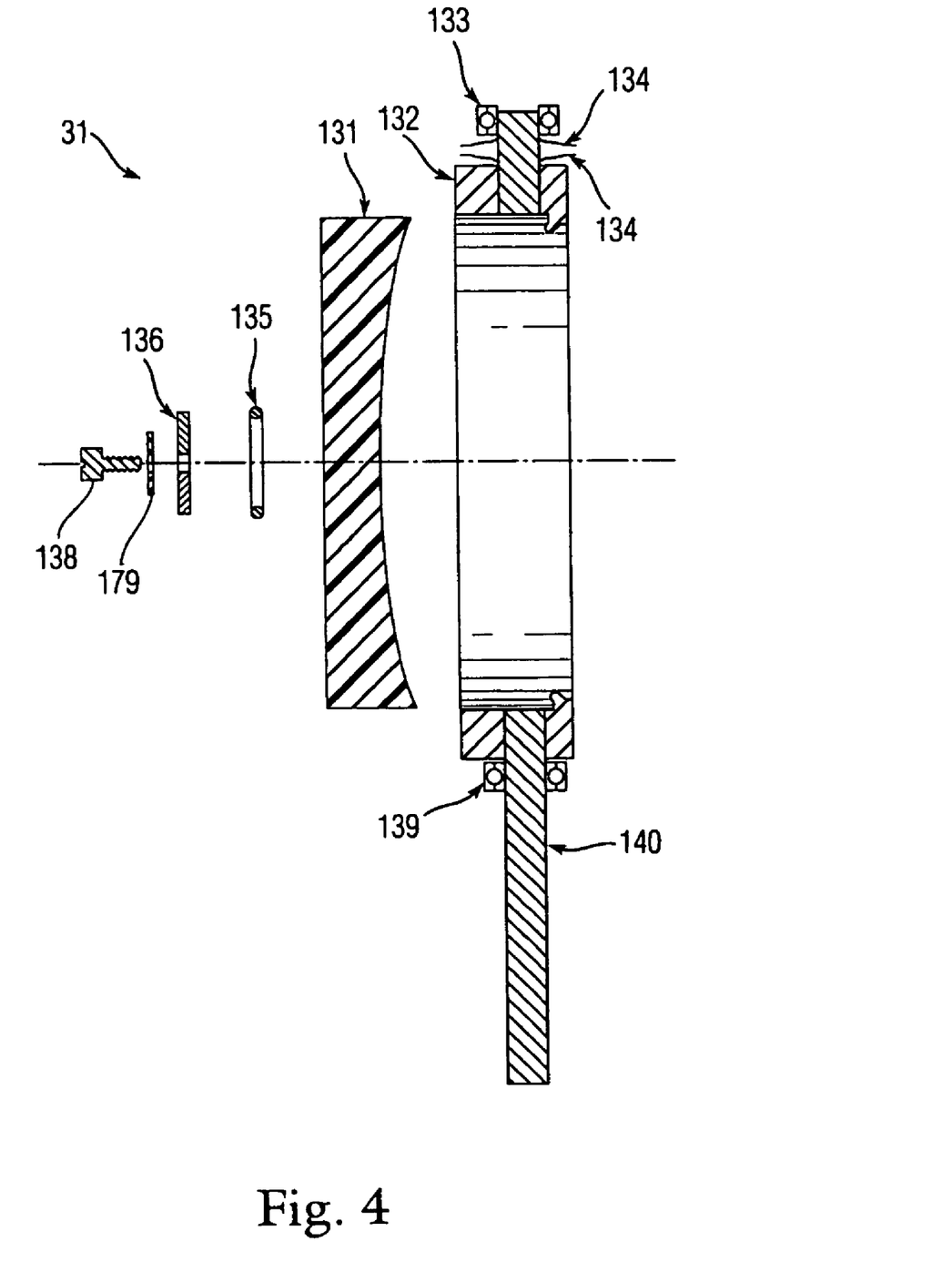
FIG. 4 is an exploded diagram of the diffraction grating and holder assembly 31.

Each of the five optical sub-assemblies as well as the diffraction grating and holder assembly 31 will be described in more detail, beginning with the latter FIG. 4 is an exploded diagram of the diffraction grating and holder assembly 31, which includes a diffraction grating 131 secured by a collar-like grating mount 132, which is rotatably mounted on a cylindrical stainless steel shaft flexible coupling. An upper shaft bearing 133 and a lower shaft bearing 139 are inserted onto the respective ends of shaft flexible coupling. It is very important that the bearing-to-shaft fit be a snug slip fit with no lateral movement. The diffraction grating 131 is secured into the grating mount 132 by two sandwiched O-rings 135, 136 pressed against the backside, and a securing strap 136 secured to the edges of the grating mount 132 via screws 138 and star washers 179 anchored therein. The strap 136 against the O-rings 135, 136 snugs the diffraction grating 131 but allows rotation of the grating 131 within its mount 132 for alignment. As seen in FIGS. 1 and 2, the rotatable diffraction grating assembly 31 is located behind baffle 13 and is enclosed by baffle 13 and walls 15 in the light-protected enclosure of the support frame. The diffraction-grating 131 is a commercially available component and a variety of such are suitable for the present application. One example is a Hitachi Holographic Grating, for use in near IR, provided with a groove density of approximately 600 grooves/mm and 120 mm×flexible coupling mm in size. The stainless steel shaft flexible coupling is anchored at both ends via upper shaft bearing 133 and a lower shaft bearing 139 in platforms 10B and 10C of the frame, respectively. The upper shaft bearing 133 and a lower shaft bearing 139 are preferably both self-lubricating bushings to reduce friction and wear, and to provide low friction oscillation.

This construct for the diffraction grating and holder assembly 31 assures precise, unwavering alignment with maximal ruggedness.

The five sub-assemblies, including light source assembly 51, entrance optics block 21, entrance slit/shutter assembly 90, exit slit assembly 61, and exit optics block 41, are all secured to platform 10C on the optical bench in advance of baffle 13.

As best seen in FIG. 1, the light source assembly 51 comprises a monoblock mounting bracket 53 with a central aperture in which a broadband light source 55 is mounted. Preferably, the light source 55 comprises a halogen light bulb, though other broadband sources may suffice. The light source 55 is wired to a main circuit board 20 (to be described) and emits broadband light through the monoblock 53.

Figure 5:
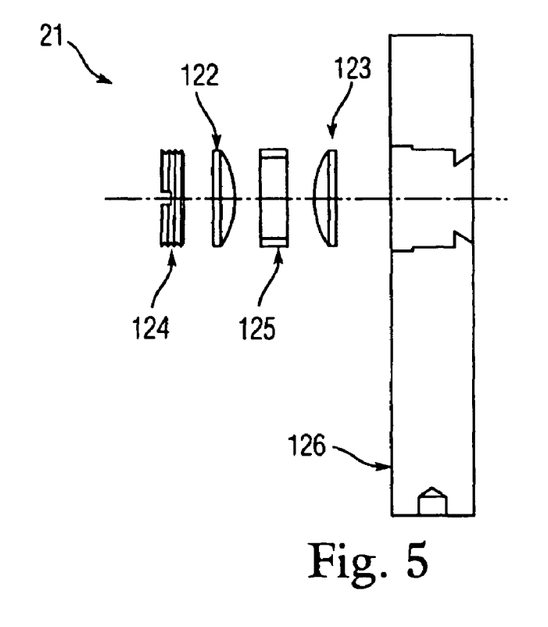
FIG. 5 is an exploded perspective view of the entrance optics block 21.

FIG. 5 is an exploded perspective view of the entrance optics block 21, which includes an expander lens assembly including an opposing pair of plano-convex lenses 122, 123 spaced by a spacer ring 125, and a threaded retainer ring 124 for securing the foregoing components into a lens holder block 126 which is machined with an appropriate threaded through-bore.

Figure 6:
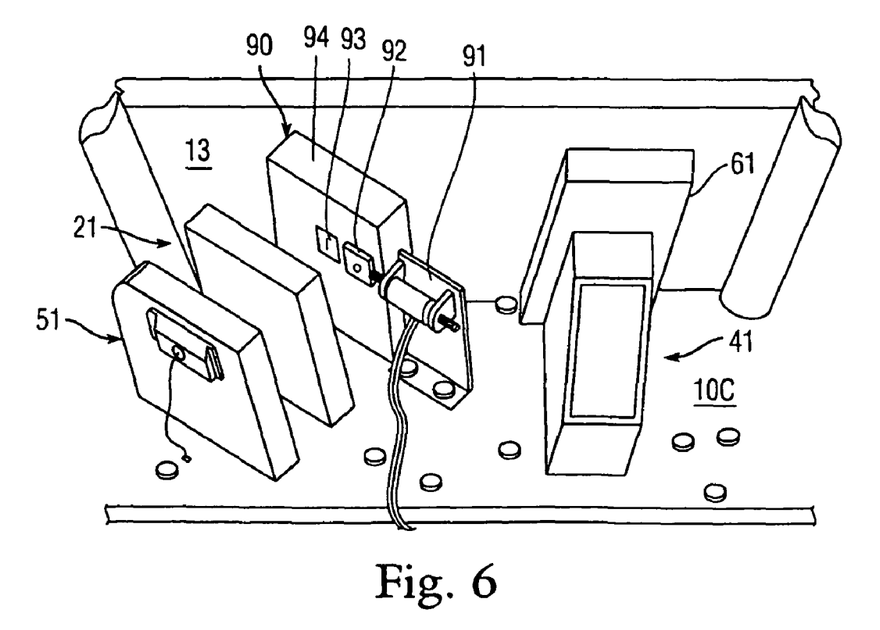
FIG. 6 is an enlarged view of the entrance slit/shutter assembly 90.

FIG. 6 is an enlarged view of the entrance slit/shutter assembly 90, which generally comprises a mounting block 94 secured to platform 10C and having an aperture there through with a frontal entrance slit 93. The entrance slit 93 is selectively covered and/or uncovered by a sliding shutter 92, which is driven by an offset solenoid 91 also mounted on an adjoining bracket to platform 10C. The solenoid 91 is connected to the underlying circuit board 20 (and a host processor) for automatic control thereby. The external solenoid 91 selectively opens and closes the aperture 93 to provide three scan modes: a dark scan, calibration (or reference) scan, and a live scan, the difference between the dark scan and calibration scan being used as a reference for the live scan as described below. Any of a variety of commercially-available shutter mechanisms may be used for this purpose.

Referring back to FIG. 1 the exit slit assembly 61 comprises a monoblock mounting bracket having an aperture there through with a frontal exit slit 63. The baffle 13 immediately behind both the entrance slit 93 and exit slit 63 is defined by circular apertures for passing the light.

Figure 7:
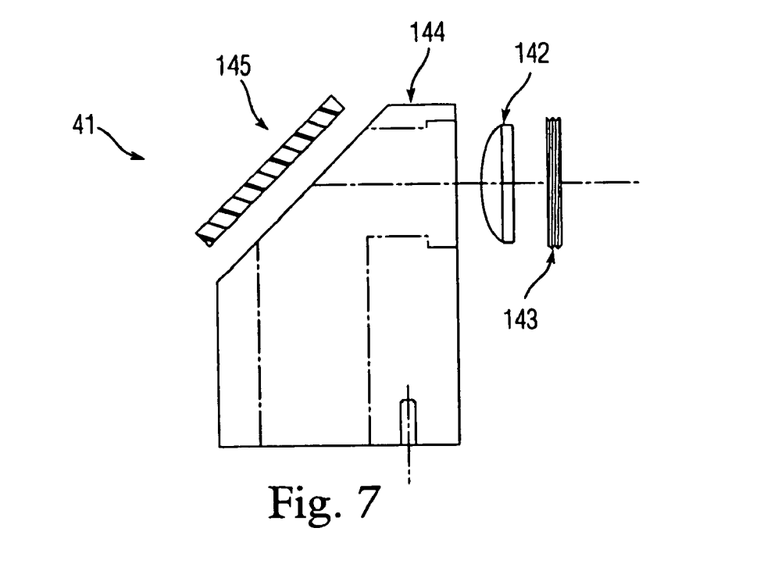
FIG. 7 is an exploded perspective view of the exit optics block 41.

FIG. 7 is an exploded perspective view of the exit optics block 41 which comprises a plano-convex collection lens 142 secured in a mounting block 144 by a threaded retaining ring 143. The mounting block 144 includes an internal aperture directed against a right angle mirror 145 mounted to the backside of the block 144, the aperture continuing downward for reflecting the collected light down through an aperture in the platform 10C, into the sample drawer 23 there beneath, and onto the sample to be analyzed. The scanned spectral light impinges on the sample and the diffusely emergent light is collect into a conventional optical detector 80 (see FIG. 8) of suitable responsivity over the wavelength range of interest, located in the lower electronics compartment of the support frame, in a known manner to provide a quantitative analysis of any of a variety of characteristics of a sample, including constituent analysis, moisture content, taste, texture, viscosity, etc.

Figure 9:
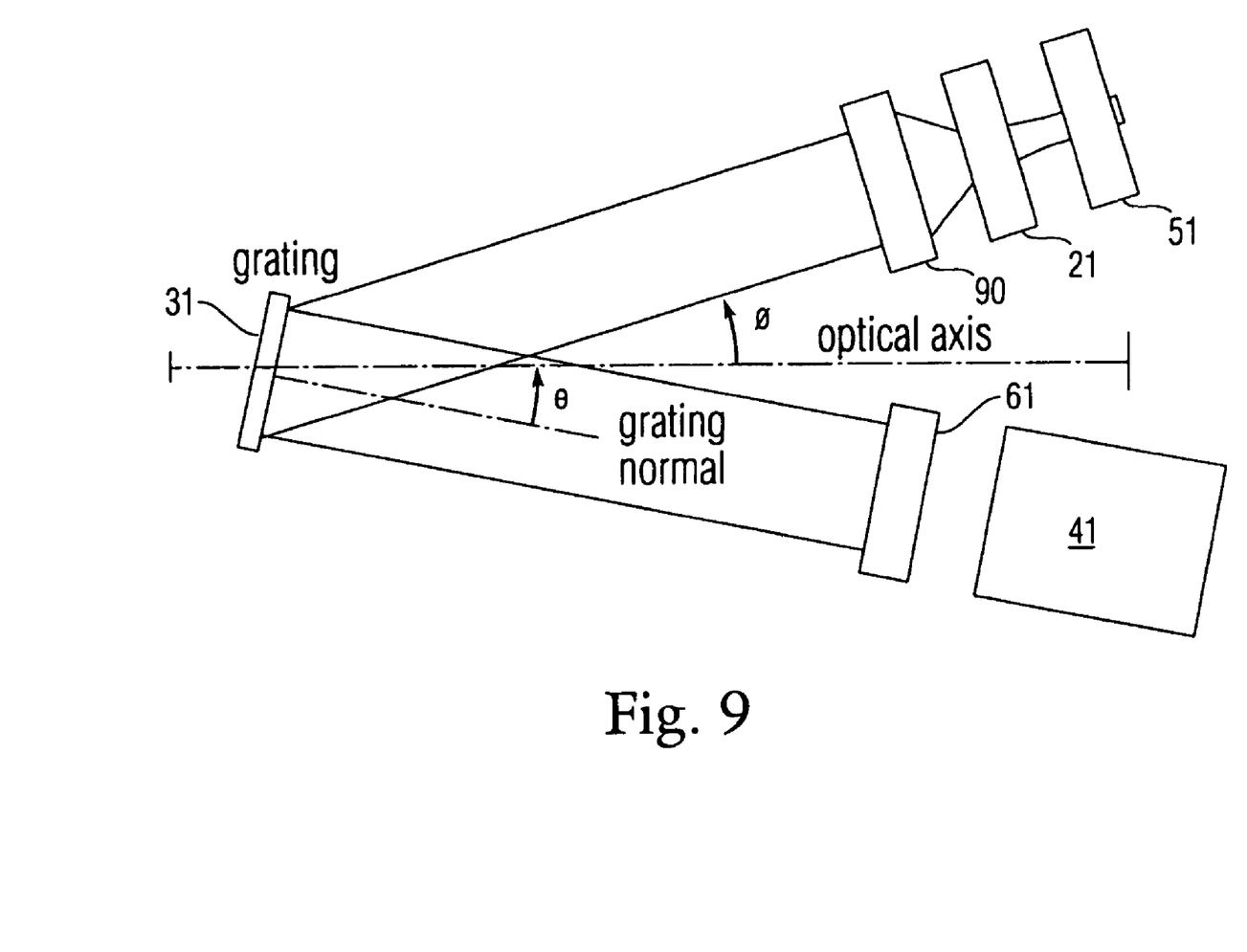
FIG. 9 is a system diagram of the optical configuration.

FIG. 8 is a side perspective view of the sample tray 23 seated atop a drawer 25 which slides on brackets 27 into the lower compartment of the support frame. Preferably, sample drawer 23 is gear-driven by a PM stepper-motor 10 which is also connected through main circuit board 50 (see FIG. 2) to a remote programmable controller (PLC) or computer for activation. The removable sample tray 23 sits atop sample drawer 25 for depositing a sample to be analyzed. FIG. 9 is a system diagram of the optical configuration showing the layout of the oscillating diffraction-grating 31 with respect to the light source assembly 51, entrance optics block 21, entrance slit/shutter assembly 90, as well as the exit slit assembly 61 and exit optics block 41. Equal focal lengths are provided to the entrance optics block 21 and exit optics lock 41 and through the focusing elements so net image magnification=1. The magnification or minification of the system can be adjusted as may be required due to sample geometry or size and instrument footprint. For samples with very strong NIR absorption bands, the optical geometry could be reduced sacrificing signal-to-noise performance. The grating 131 rotates around a plane through the center of its face. The angle, $D_v$, is, therefore, a constant. Given the system diagram of FIG. 9, the grating equation that defines system response is as follows:

$$\alpha = \sin^{-1}\left[\frac{10^{-6}kn\lambda}{2\cos(D_V/2)}\right] - \frac{D_V}{2}$$

Key to Symbols Used in Formula

α—angle of incidence expressed in degrees k—diffraction order integer n—groove density (grooves/mm)

$D_v$—the included angle (or deviation angle) expressed in degrees

λ—wavelength in vacuum (expressed in nanometers (nm, where 1 nm=$10^{-6}$ mm))

Referring back to FIG. 3, a main circuit board 20 is mounted beneath platform section 10C (on the electronics bench) and this contains the electronics to drive the light source 55, solenoid 91, sample tray 23, oscillating diffraction grating assembly 31, and as well provide communication outputs to a host processor or remote programmable logic controller (PLC) for measurement. It is noteworthy that the present functions of the PLC may alternately be implemented by an internal microprocessor coupled to online analyzers via D/A outputs.

Figure 10:
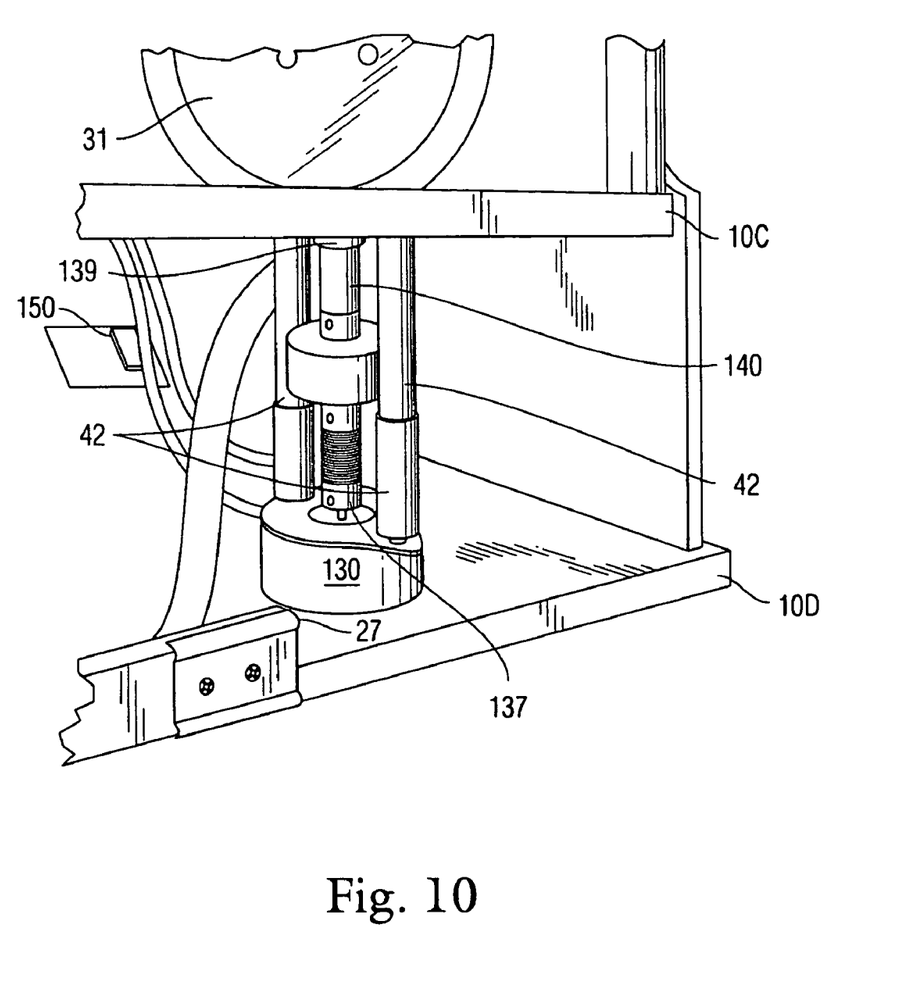
FIG. 10 is an enlarged view of the diffraction grating drive motor 130 that is mounted below the panel surface 10C along with an optical encoder 40.

FIG. 10 is an enlarged view of the diffraction grating drive motor 130 that is mounted below the panel surface 10C on upright posts 42 to control oscillation of the diffraction grating assembly 131. The encoder 40 is mounted to the baseplate 10C (not to the upright posts 42). This is important because encoder proximity and "tightness" with grating motion is of paramount importance. Thus, the encoder 40 has to precisely reflect the grating motion. For this reason the shaft 140 is stainless and relatively thick. It is also for this reason that the motor is relatively "weak" (see below) so as not to introduce torsional forces into the shaft 140 which render an encoder 40 reading which does not reflect the grating 131 position due to its inertial mass. Preferably, the motor 130 shaft is connected through the encoder 40 via a flexible, non-dampening shaft coupling 137. The flexible coupling 137 provides complete rotational translation without backlash, such that axial motor 130 variations are not transferred to the grating shaft. In the illustrated embodiment the motor 130 is mounted beneath the encoder 40 on the pair of lateral support posts 42 extending down from platform 10C, and encoder 40 is attached to platform 10C. In the illustrated embodiment a PM stepper motor 130 is employed, though one skilled in the art will appreciate that the present invention may alternatively utilize variable reluctance motors, brushless DC motors, hybrid stepper motors, or servo motors. However, these latter two motor types are generally problematic and not as desirable. The high detent torque of hybrid steppers results in large PWM correction factors during each step, in turn resulting in less than optimum constant velocity motion. The drive requirements of servo motors is usually complex and requires expensive amplifiers, otherwise these motors shudder at a microscopic scale (an undesirable side effect). Consequently, the preferred stepper motor 130 is a conventional stepper motor, preferably an inexpensive and very low detent torque PM stepper motor. For example, a low detent torque PM stepper motor having a 7.5 degree per-step rotation, such as a 2-phase 7.5 stepper available from Sigma Instruments, Inc., is well-suited. Of course, in order to attain the necessary resolution, a number of precautions must be taken in order to guard against slippage of the stepper motor 130. Otherwise, even the slightest amount of mechanical offset can invalidate a scan. In this regard, the encoder 40 is mounted directly above the motor 130 and is attached by brackets to platform 10C as close to the diffraction grating as possible to minimize possible offsets. For samples with very strong NIR absorption bands, the optical components could be reduced sacrificing signal-to-noise performance. The motor 130 is mounted on the downwardly extending support posts 42 to the baseplate 10C and is connected to the grating shaft 140 through a flexible non-dampening coupling 137 which has no rotational play but allow axial misalignment to be corrected while applying the least amount of axial force on to the grating shaft flexible coupling. It is critical that motor shaft aberrations (such as eccentricity, axial variation, vibration, etc.) not propagate to the grating shaft, and also minimizes the length of the grating-shaft which exaggerates mechanical errors. In addition, further precautions may be taken such as pre-loading the stepper motor's rotor (or pre-loading bushings 133, 139) using a spring-bias or spring-arm to guard against vibrations and overshoot.

In order to keep the diffraction grating assembly 31 oscillating smoothly and vibration-free, the stepper motor 130 is driven with a unique intermittent lubrication routine, to make use of the self-lubricating bearings 133, 139, thereby prolonging the life of the mechanical assembly. Specifically, the diffraction-grating assembly 31 is periodically rotated through at least one, or two or three, etc, complete revolutions to maintain a proper grease distribution within the self-lubricating bushings 133, 139, thereby increasing the useful life of said bushings. In the preferred embodiment two revolutions are used.

In operation of the monochromator 2, a black background scan is conducted and, after the background scan, a calibration scan is conducted, followed by a live scan. The background scan is accomplished with the shutter assembly 90 closed. During the calibration and live scans, when the shutter assembly 90 is opened, light is sent to diffraction-grating assembly 31 for scanning a reference object (for calibration) and then the sample of interest (during live scan) in sample drawer 23. In both cases the light is diffracted from grating assembly 31 and is split into its wavelength components which are scanned across the exit slit assembly 61 and into output block 41.

To perform a precise measurement the angular position of diffraction-grating shaft 140 must be known with extreme accuracy. The present invention accomplishes this without relying on a Hall effect sensor, as is conventional. Instead, and as seen in FIG. 10, this is accomplished with the optical encoder 40 that is mounted axially on the diffraction-grating shaft 140 for rotation therewith, plus a high-speed hardware chronometer 150 resident on circuit board 20, both the chronometer 150 and encoder 40 being electrically-connected to the remote programmable controller (PLC) or computer (connected to and communicating through circuit board 20). Optical encoder 40 is a conventional optical encoder, preferably having at least 2000 pulses per revolution. The chronometer 150 may be a fully asynchronous START/STOP Chronometer Module such as is commercially available from Electro-Optic Devices, Inc., or any suitable chronometer module having single sample, time interval accuracy in microseconds (or finer resolution for higher scan speeds). The chronometer module 150 also communicates with the programmable controller (PLC) or computer. At 2000 pulses per revolution the encoder 40 would normally be capable of 0.18 degree per-pulse resolution, or 7.5 nm. However, the industry standard requires approximately 0.05 degree resolution, or 0.12 nm. Thus, in accordance with the present invention speed interpolation is used to achieve a higher accuracy. The pulses of the encoder 40 determine the rotational speed of the grating shaft 140 and form the basis of interpolated velocity and position calculations needed for the reduction of the sampled signal data to reconstruct the desired evenly spaced spectral measurement points. The reconstruction process is accomplished by time stamping each encoder 40 pulse with the chronometer 150 output, computing the velocity at that point, and storing each pulse ID, time stamp and velocity. The stored velocities can be used on the fly to calculate the exact position of the encoder for any virtual sample point lying between adjacent encoder 40 pulses. From the computed velocity and the known sampling interval it becomes possible to reconstruct a virtual sampled point between actual encoder pulses at the appropriate point in time. For example, given the known speed of the encoder 40 at two adjacent pulses Te and Te+1, and given an actual sample reading Tsample lying midway between the two encoder pulses Te and Te+1, the actual encoder 40 position is extrapolated on the fly from the known speed measurements to determine the exact position of the encoder 40 at Tsample, even though it is between encoder pulses, effectively boosting the resolution from 7.5 nm to the requisite 0.12 nm. This method of interpolation allows sampling at a higher sampling rate than would otherwise be possible with a standard 2000 pulse encoder, effectively resulting in superior sampling accuracy. A specific example follows:

Once the system is within the proximity of the start of a spectral scan, the chronometer module 150 timing is initiated. Each encoder 40 edge is timestamped with the chronometer 150 time. Sample data is taken at constant time intervals such as 16, 32, 64, or 128 uS to assure adequate samples from which good spectral reconstruction can result. The selection of the time interval is based on processor memory and speed capabilities, the velocity of the grating, and the number of sample data points desired to be used for each computed spectral data point. The current embodiment utilizes linear interpolation and utilizes approximately 1.4 times as many sample data points as computed spectral points. Thus, if encoder edges occurs at Te0 and Te1, there will typically be 12-16 spectral auto-samples taken between these edges. Using ensemble averaging the actual encoder events Te0 and Te1 are adjusted to create virtual encoder events Te'0 and Te'1 which reflect the true position of the encoder edge given the system dynamics and eliminating the encoder edge noise customary in optical encoder designs. Employed implementations resulted in encoder edge definition to better than 1%, allowing a practical introduction of approximately 100 virtual encoder counts, referred to as micro-ticks. Each encoder 40 edge including Te0 and Te1 represents a physical position in angular space. However, given the time stamps and velocities at each encoder edge, the programmable controller (PLC) or computer creates a sampling table defining the exact wavelength of interest in physical space, mapping the virtual encoder events Te'0 and Te'1 to a precision consistent with the micro-tick multiplier, between the actual encoder events Te0 and Te1. From this sampling table, which is constructed in micro-ticks, and the actual samples collected in microsecond time space, in conjunction with the virtual encoder edges defined in time as well, a linear mapping can be projected by which time stamps can be assigned to any sample using the virtual encoder events, even if the sample occurs between actual encoder pulses. Presently, the sampling table is constructed using simple linear interpolation, as this is the first order of approximation. However, it is equally feasible through the availability of more sophisticated processors such as digital signal processors (DSPs) to provide higher order spline interpolations thereby increasing the accuracy even further.

To illustrate the process of simple linear interpolation, assume an Nth sample is at a position E15103 (measured in micro-ticks) and the actual.encoder edges E__14894 and E__15204 (a 310 fold multiplier to the Encoder Spacing) are sampled at T__4556790 and T__4558144. With virtual sampling intervals evenly spaced at T__100 events, then the E__15103 event would occur at the virtual time event of T_4557702.86 which would be represented by the linear interpolation of the values T_4557700 and T_4557800. Again, this time event T_4557702.86 may be determined through linear interpolation as follows:

$$4557702.86 = 4556790 + (15103 - 14894 = 209) * (dT/dE)$$

where $dT = 4558144 - 4556790 = 1354$ and $dE = 15204 - 14894 = 310$)

Thus, The actual value is calculated as Value@T_4557700*(100−2.86)/100+Value@T_4557800*(2.86/100)

Of course, known smoothing and filtering techniques are also applicable in achieving better signal to noise performance, and linking the smoothing to the optical bandwidth of the system and performing operations consistent with a Savitsky-Golay profile would further improve system performance (Savitsky-Golay filters are generally used in mass spectrometry and optical techniques).

Since the sample data is present both in time sampled and spatially correlated methods, it is furthermore possible to provide correction to the sampled data to eliminate electronic noise artifacts for slow detectors (such as PbS Lead Sulfide Infrared Detectors) and correct for noise which is pink in nature, thereby improving and conditioning the analog signal to the physical reality of optical signal absorption response, i.e. responses inconsistent with the bandwidth of the optical system can be attenuated to achieve better electrical signal to noise than would otherwise be possible. Thus, encoder edge jitter or other mechanical inaccuracies can be corrected by "ensemble smoothing" the encoder edges to be reflective of true inertia mechanics of the system, effectively interpolating out encoder edge noise or other inaccuracies. With careful analysis, it is possible to achieve substantial signal reconstruction and noise filtering far beyond systems which do not have the correlated time/space relationships possible with the present interpolation method.

The encoder/reader 40, the stepper motor 130, the solenoid 91, and the optical sensor 80 are all connected through the main circuit board to the remote PLC/computer processor for remote control operation and analysis.

The general operation of the above-described modified Turner plane-grating monochromator 2 will now be described. First the drawer 25 is positioned in the fully open state to position the Optical Reference 182 in the exact location a sample would occur. Alternatively, a reference spectral sample may be placed into the sample cup 23. A Spectralon (tm) puck is used as a reference sample in the preferred embodiment. However, ceramic or any other suitable spectral reference may be used. A reference or "calibration" spectral scan is taken of the reference sample. At the end of the scan the shutter is activated, and a dark energy reading is taken. Typically the dark reading involves shuttering the light and measuring the dark level at detector 80. The dark value compensates for detector offsets and dark current, as well as broadband graybody emanations from the sample or reference. After a reference scan has been acquired, a sample is loaded on the sample drawer 23 and the drawer is closed to position the sample inside the illumination and collection of the analyzer 2. A scan is taken with the shutter open and a dark value is taken to compensate for graybody radiation. The results from the dark scans are subtracted from each wavelength in the calibration and sample scans and the results of the attenuated calibration scan and the live scan are then ratioed. The calibration scan and ensuing results significantly improve the accuracy of the scans, and the present invention accomplishes this in a much more convenient and economical manner.

Traditionally, calibration takes place at the factory using polystyrene samples or the like with known sampling characteristics. To recalibrate the system, it must be taken offline and returned to the factory. The inventive calibration concept employed herein uses of artifacts of the grating response, especially discontinuous artifacts such as Woods anomaly and/or water bands that permits calibration of the system in a temperature independent manner, in the field, in a manner that is not possible with polystyrene calibration samples.

Figure 11:
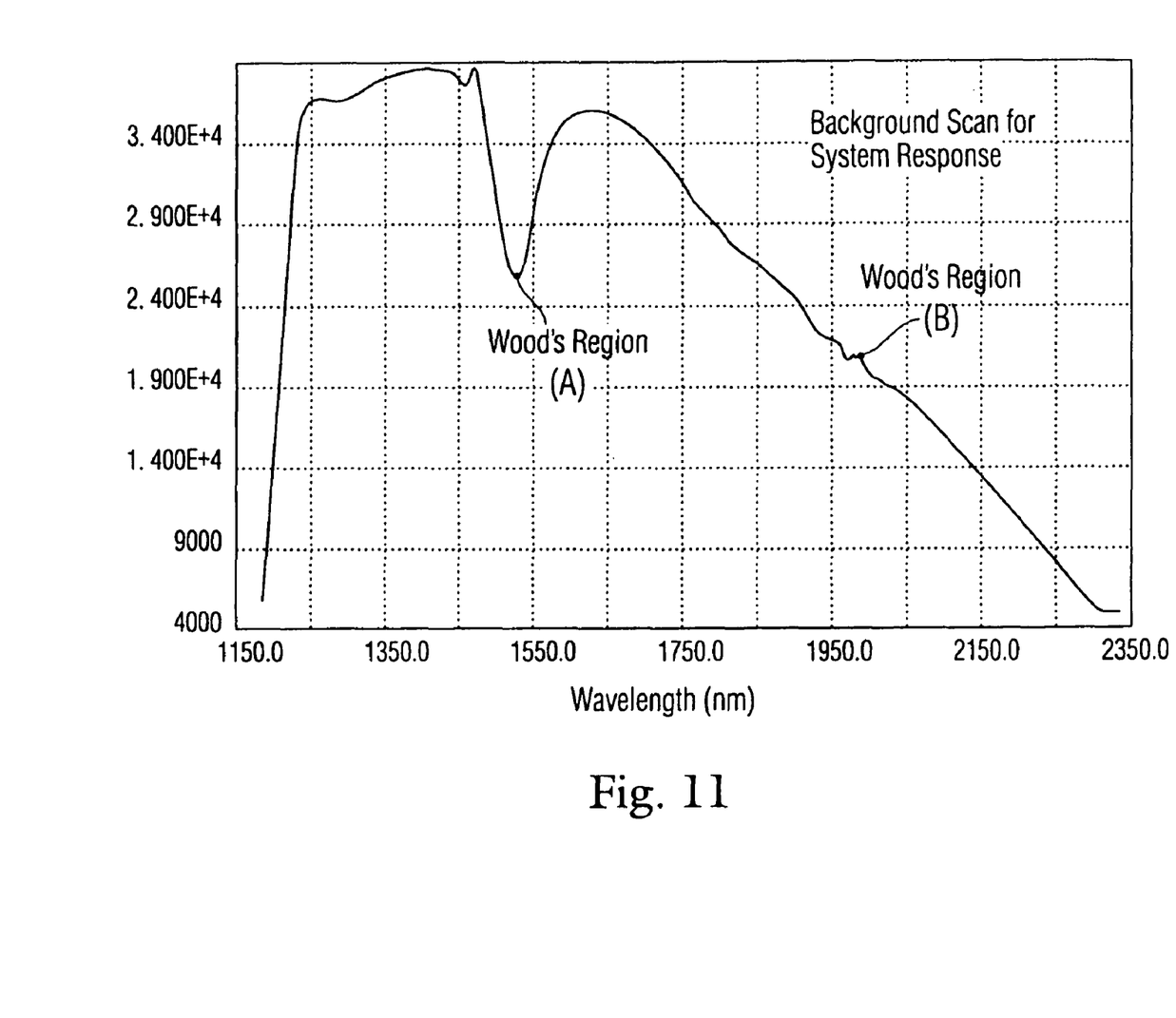
FIG. 11 is a plot of a background scan which illustrates the occurrence of Wood's regions.

FIG. 11 is a plot of a background scan which illustrates the occurrence of Wood's regions (marked as such). The position of the Wood's regions are well-defined and consistent from scan to scan, and the plot of FIG. 11 represents the grating function which reflects an amalgam of characteristics of the light source 50, the entrance optics 21, the diffraction grating 31, the exit optics 41, etc. In accordance with the present invention, a dark background scan is taken at periodic intervals. Each time the background plot is stored in memory so that it can be ratioed with the live scan. In accordance with the present invention, a background scan is calibrated based on the position of the primary Wood's regions (A) during the background scan to provide a single calibration point. In particular, the software scanning engine resident in the remote PLC/computer processor is programmed to resolve the position of the Wood's region (A) during each background scan as shown in FIG. 11, and to compare this data against baseline stored values established at factory calibration. The comparison is used to calculate offset values for adjustment of the live scan. This single calibration point based on the Wood's anomaly compensates for mechanical and optical irregularities resulting from manufacturing tolerances and worn parts. The Wood's-alignment approach is distinguished from prior art monochromators which calibrate based on reference scans using a standard sample (typically polystyrene) from the National Association of Standards and Technology (NIST. The advantage with the present calibration approach is that the monochromator can be calibrated frequently, at time intervals ranging from just prior to every live scan to every ten or twenty minutes, or longer (up until the long term instability of the system hampers accurate matrix analysis). Moreover, calibration can take place in the field without the need for expensive sampling standards.

Again, the above-described Woods anomaly calibration provides a single point of correction. To additionally utilize the Wood's region (B), the 1900 nm water bands, or similar stable Wood's-like anomalies in another region to establish a secondary point for linearization purposes, these grating response artifacts thereby providing a second major calibration point.

In both cases, the inventive concept is the use of artifacts of the grating response, especially discontinuous artifacts such as Woods anomaly and/or water bands that permits calibration of the system in a temperature independent manner, which is not possible with filters or polystyrene. This method is as direct a calibration method as can presently be achieved.

After both a dark scan and the above-described calibration scan, a live scan is conducted. During the live scan, light from the light source 51 is focused through the entrance optics assembly 21 which expands and directs the white light through the entrance slit/shutter assembly 90 and toward the oscillating diffraction-grating 31. The diffraction-grating 31 is oscillated directly by the stepper motor 130 mounted in the lower compartment of the support frame. Light passing through the slit/shutter assembly 90 is diffracted off the oscillating diffraction-grating 31 and is split into its various wavelengths. The diffracted wavelengths are scanned across exit slit 63 and are then reflected by the exit optics assembly 41 down onto the sample drawer 23 and onto the sample to be analyzed. In this manner the sample is successively illuminated by the full spectrum of wavelengths. The absorption spectra reflected from the sample are picked up by the optical detector 80 for quantification by the remote PLC or computer control system.

Given the dark scan and calibration (or Reference Scan), the results from the dark scan are subtracted from each wavelength in the calibration scan. After the live scan, the results of the attenuated calibration scan and the live scan are then ratioed.

Figure 12:
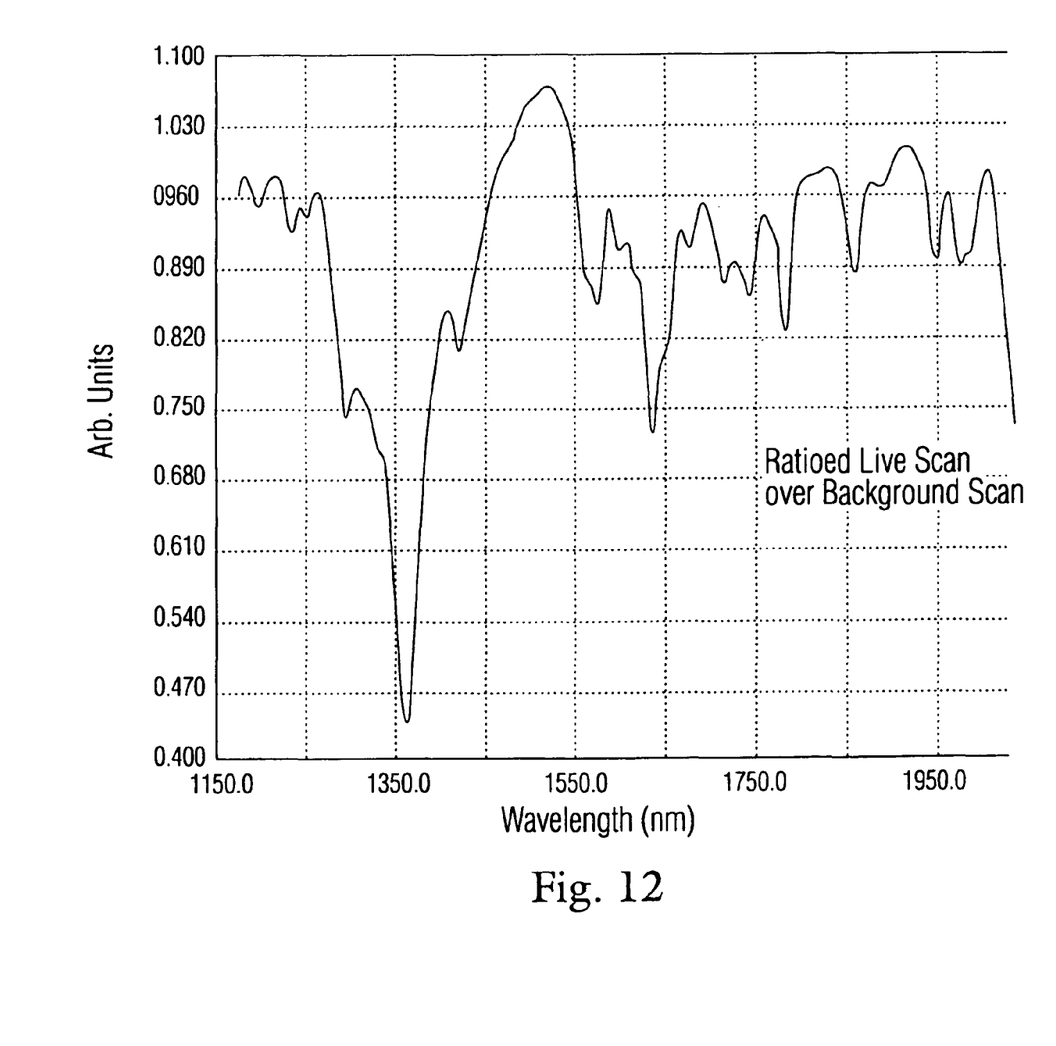
FIG. 12 is a plot of a live scan which has been ratioed by the scanning engine

FIG. 12 is a plot of a live scan which has been ratioed by the scanning engine (remote PLC or computer control system) with the background plot of FIG. 11.

In addition to the Wood's-alignment approach described above, the software scanning engine resident in the PLC/computer processor may be specially-programmed to accomplish a number of other unique advantages. For example, to determine the exact angular position of diffraction-grating 31, the feedback coordinate data from encoder 40 is analyzed in combination with the feedback of coordinate data for the stepper motor 130. The host processor maps the signals input to stepper motor 130 with the angular output as measured by encoder 40. If the grating motion deviates significantly beyond expected limits of variation the distortion of the sampling interval will distort the true sampling from its virtual point to an extent that the collected scan will become worthless. Thus, whenever a signal input to stepper motor 130 fails to result in angular output, the processor knows that slippage has occurred. The scan is flagged as a bad scan and an error report is provided to that effect. With additional velocity variation information it may even be possible to correct for inter-encoder pulse scan velocity variations on the fly using the ensemble smoothing approach described above.

Operation of the stepper motor 130 as described above yields extremely stable and accurate oscillation of the diffraction-grating 31. The mechanism is capable of more than 32,000 incremental angular-displacement steps over a usable 450 range of dispersion-element rotation. The exact angular position of the diffraction-grating 31 can be determined with great accuracy. The direct drive configuration and control system also make it possible to incorporate a number of tolerance-correcting measures which are programmed into the control system. Specifically, the control system is capable of pre-programmed smoothing to achieve the requisite rotational resolution introduction. This is accomplished by monitoring data from the encoder 40, and introducing local phase delays to the stepper motor 130 to adjust for aberrations in the optical and mechanical system, thereby providing a linear composite wavefront and more accurate results to minimize the effects of mechanical tolerances, wear, and Wood's anomalies.

Furthermore, the direct-drive PM stepper configuration and control system is pre-programmed to rotate the stepper motor one, two or three complete revolutions at predetermined intervals to reorient the grease in bushing(s) 133, 130, thereby reducing wear. This was not previously possible in the context of a mechanical reduction gear systems, and such systems were prone to mechanical failure and wear.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. An apparatus for high speed spectroscopic sample analysis, comprising:
   a light source for illuminating a sample;
   an oscillating diffraction-grating mounted on a rotatable shaft for breaking broadband light from the light source into spectrographic constituent wavelengths;
   a programmable stepper motor having a shaft connected directly to said diffraction grating for direct drive thereof, and controlled incremental rotation of said diffraction-grating over an angular range in order to scan each of said constituent wavelengths;
   an encoder mounted proximate said diffraction-grating for outputting pulses corresponding to an angular position of said diffraction-grating within said angular range; and
   a processor in communication with said programmable stepper motor and said encoder for incremental control of the rotation of said stepper motor and diffraction-grating within said angular range in accordance with said encoder output pulses, said processor time-stamps each outputted encoder pulse within said angular range and computes a rotational velocity of said diffraction grating for each outputted encoder pulse.

2. The apparatus of claim 1, further comprising a sample tray for holding a sample in position for spectroscopic scanning.

3. The apparatus of claim 1, further comprising a collimating entrance optic assembly in advance of said light source for collimating light therefrom.

4. An apparatus for high speed spectroscopic sample analysis, comprising:
   a light source for illuminating a sample;
   an oscillating diffraction-grating mounted on a rotatable shaft for breaking broadband light from the light source into spectrographic constituent wavelengths;
   a programmable stepper motor having a shaft connected directly to said diffraction grating for direct drive thereof, and controlled incremental rotation of said diffraction-grating over an angular range in order to scan each of said constituent wavelengths;
   an encoder mounted proximate said diffraction-grating for outputting pulses corresponding to an angular position of said diffraction-grating within said angular range;
   a processor in communication with said programmable stepper motor and said encoder for incremental control of the rotation of said stepper motor and diffraction-grating within said angular range in accordance with said encoder output pulses;
   an entrance slit in advance of an entrance optic assembly;
   a shutter mechanism for selectively shuttering the entrance slit;
   an exit slit in an optical path of said diffraction grating; and
   an exit optic assembly for directing light from said exit slit toward a sample tray holding the sample.

5. The apparatus of claim 1, further comprising an optical sensor for collecting said constituent wavelengths reflected by the sample.

6. An apparatus for high speed spectroscopic sample analysis, comprising:
   a light source for illuminating a sample;
   an oscillating diffraction-grating mounted on a rotatable shaft for breaking broadband light from the light source into spectrographic constituent wavelengths; and a programmable motor having a shaft coaxially coupled to said diffraction grating via a flexible non-dampening coupling for direct drive thereof, and incremental rotation of said diffraction-grazing in order to scan each of said constituent wavelengths.

7. The apparatus of claim 6, further comprising a sample tray for holding the sample in position for spectroscopic scanning.

8. The apparatus of claim 6, further comprising a collimating entrance optic assembly in advance of said light source for collimating light therefrom.

9. The apparatus of claim 8, further comprising an entrance slit in advance of said entrance optic assembly.

10. The apparatus of claim 8, further comprising a shutter mechanism for selectively shuttering an entrance slit.

11. The apparatus of claim 8, further comprising an exit slit in an optical path of said diffraction grating.

12. The apparatus of claim 8, further comprising an exit optic assembly for directing light from an exit slit toward a sample tray holding the sample.

13. The apparatus of claim 8, further comprising an optical sensor for collecting said constituent wavelengths reflected by the sample.

14. An apparatus for high speed spectroscopic sample analysis, comprising:
    a light source for illuminating a sample;
    an oscillating diffraction-grating pivotally-mounted on a rotatable shaft for breaking said broadband light from the light source into spectrographic constituent wavelengths, said shaft being rotatably anchored between two opposing platforms in self-lubricating bushings mounted in the respective platforms; and
    a programmable motor having a shaft connected directly to said diffraction grating for direct drive thereof, and incremental rotation of said diffraction-grating in order to scan each of said constituent wavelengths, wherein periodic rotation of said diffraction-grating through at least one complete revolution maintains a proper grease distribution within said self-lubricating bushings, thereby increasing the useful life of said bushings.

15. The apparatus of claim 14, further comprising a sample tray for holding a sample in position for spectroscopic scanning.

16. The apparatus of claim 14, further comprising a collimating entrance optic assembly in advance of said light source for collimating light therefrom.

17. The apparatus of claim 14, further comprising an entrance slit in advance of an entrance optic assembly; and a shutter mechanism for selectively shuttering said entrance slit.

18. The apparatus of claim 14, further comprising an exit slit in an optical path of said diffraction grating; an exit optic assembly for directing light from said exit slit toward a sample tray holding the sample; and an optical sensor for collecting said constituent wavelengths reflected by the sample in said sample tray.

* * * * *